Sept. 21, 1954          N. I. PEYTON          2,689,537
METHOD OF MAKING VARIEGATED ICE CREAM AND THE LIKE
Original Filed Feb. 20, 1951
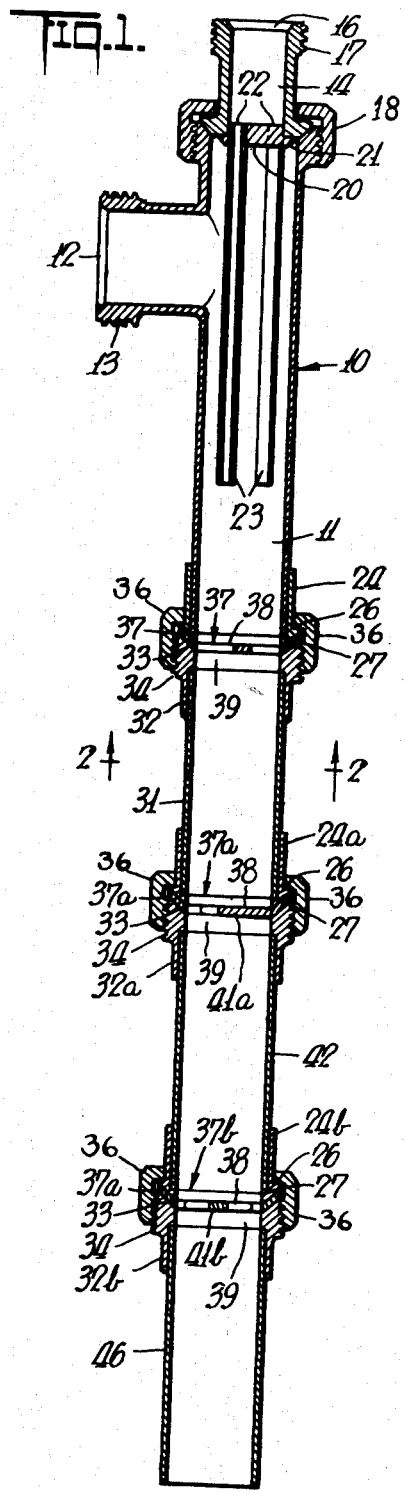
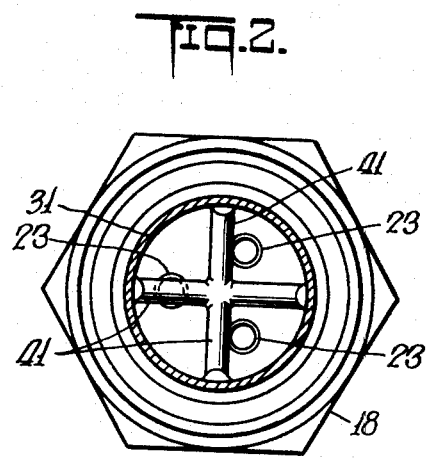
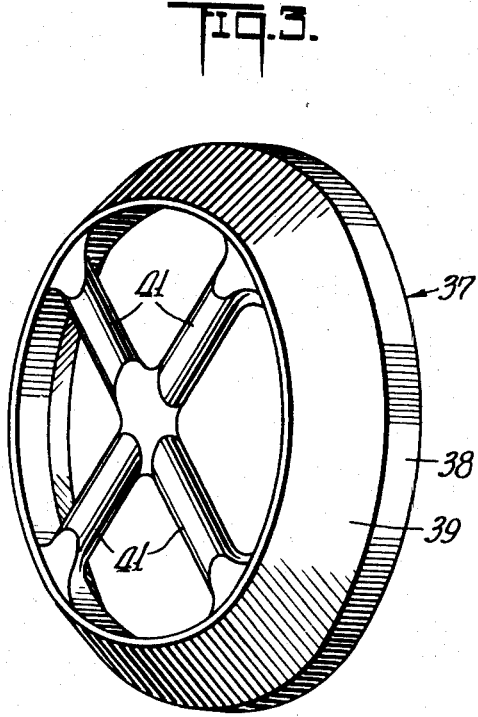
INVENTOR
Norman I. Peyton
BY
ATTORNEY Patented Sept. 21, 1954

2,689,537

UNITED STATES PATENT OFFICE 2,689,537

METHOD OF MAKING VARIEGATED ICE CREAM AND THE LIKE

Norman I. Peyton, Baltimore, Md., assignor to Joe Lowe Corporation, New York, N. Y., a corporation of Delaware Original application February 20, 1951, Serial No. 211,883, now Patent No. 2,669,946, dated February 23, 1954. Divided and this application January 15, 1953, Serial No. 331,398

4 Claims. (Cl. 107—54)

This application is a division of my co-pending application Serial No. 211,883, filed February 20, 1951, now Patent No. 2,669,946, dated February 23, 1954, entitled "Ice Cream Variegating Nozzle."

The present invention relates generally to a method for making a frozen edible product, such as a variegated ice cream and the like substances, and it has particular relation to the use of a non-mechanical variegator, such as a nozzle, having no moving parts, whereby the cores of contrasting flavoring material in a basic substance are broken up and dispersed within said substance in passing through said nozzle.

Heretofore, there have been two kinds of variegating apparatus, the non-mechanical having no moving or driven parts, and the mechanical having power driven parts. With the non-mechanical types of variegators, a base of semi-frozen ice cream or like substances has been fed under pressure to a chamber, whereupon a continuous charge of a contrasting flavoring syrup, such as chocolate, was introduced therein, and the composite mass was thereupon extruded with the flavoring material extending through the basic substance in the form of a core or plurality of cores. The extruded plastic mass, in such an operation, was discharged into a rotating container to break up the flavoring cores and disperse them in disconnected portions throughout the basic material. If no rotating receiving container mechanism was available, the composite mass was dumped back and forth from one container to another to cause a breaking up of the continuity of the flavoring cores. With the so-called "mechanical" variegators, the flavoring syrup was passed through a rotary disk valve, which was motor driven, and the flavoring cores were broken up and dispersed in the basic substance or the flavoring material was introduced into a moving stream of basic substance in a series of short successive shots or charges.

With the present invention, the desired result, which is a distinctive and pleasing pattern of contrasting flavoring material in disconnected portions dispersed through the basic substance, may be obtained in a very simple, efficient and economical manner with a simple nozzle having no moving parts, and with a minimum of handling of the delicate over-run basic substance.

An object of the present invention is to provide a new and improved method of dispersing a contrasting flavoring material into a mass of basic substance of a contrasting color whereby the material is nicely and evenly distributed through the basic substance in an attractive pattern or design.

Another object of the invention is the provision of an efficient and highly sanitary method of dispersing a contrasting flavoring substance into and throughout a basic substance to provide an attractive pattern enhancing the appearance, eating qualities and eye appeal of the composite product.

Other and further objects and advantages of the invention reside in the detailed description of the method and apparatus, which result in simplicity, economy and efficiency, and which will be apparent from the following description, reference being had to the accompanying drawings, forming a part hereof, wherein like numerals indicate like parts, in which:

Figure 1 is an assembled longitudinal sectional view of an apparatus constructed in accordance with the principles of my invention;

Figure 2 is a cross-sectional view, on a larger scale, of the apparatus shown in Figure 1, the same having been taken substantially along the lines 2—2 thereof, looking in the direction of the arrows; and Figure 3 is an enlarged perspective view of one of the stationary pattern-making or dispersing disks shown in Figure 1.

Referring now to the drawings, there is shown an apparatus in the form of a nozzle 10, which consists of a lower extrusion chamber 11, having a laterally extending inlet 12 through which a basic substance may be introduced under pressure from an outside source of supply, such as, for example, a continuous freezer or other pressure supplying mechanism (not shown). The inlet 12 has a series of external threads 13 for being removably connected to a source of supply by means of a sanitary coupling (not shown).

The upper extrusion chamber 14 is mounted removably and in axial alignment above the lower or main extrusion chamber 11, and has an inlet 16 which is adapted to receive from an outside source of supply under a corresponding pressure a contrasting flavoring material, such as, for example, a plastic chocolate, fruit puree, etc. The inlet 16 also has a series of external threads 17 for being removably connected with a source of supply of the contrasting flavoring material by means of a sanitary coupling (not shown).

The lower chamber 11 and upper chamber 14 are removably connected axially together by means of a sanitary coupling 18. The upper chamber 14 has a baffle plate 20 fixedly welded across its lower opening, as indicated at 21, so as to provide a division or separation plate between the lower chamber 11 and the upper chamber 14. The baffle plate 20 has a plurality of spaced apertures 22 extending therethrough, and each aperture has an elongated delivery tube 23, mounted therein and depending from the underside thereof downwardly below the inlet and into the discharge portion of the lower chamber 11. The delivery tubes 23, each of which is of relatively small cross-sectional area, are adapted to convey the contrasting flavoring material received under pressure through their respective apertures 22 and discharge the same into the continuously moving stream of basic substance, such as soft ice cream and the like, passing through the lower chamber 11, which has a relatively large cross-sectional area as compared to the cross-sectional area of said tubes 23. The lower chamber 11 extends a substantial distance below the ends of the delivery tubes 23, for reasons to be hereinafter explained, and has an external collar or union ferrule 24 welded to its lower end, which is provided with a radial upper shoulder 26 and a beveled under shoulder 27.

A tubular extension 31 is adapted to be mounted axially below the lower end of the lower chamber 11, and has an external collar or union ferrule 32 welded or sweated over its upper end, which is provided with a beveled upper shoulder portion 33 and external threads 34. A sanitary coupling member 36 is adapted to connect removably the lower end of the lower chamber 11 and the upper end of the extension tube 31 in a conventional manner. However, before these two members are connected axially in operating arrangement, a stationary pattern-making or dispersing disk 37 is adapted to be mounted therebetween, as best shown in Figure 1. The lower or discharge end of the tubular extension 31 is provided with a union ferrule 24a, which provides means for securing a second tubular extension thereto.

The stationary pattern-making or dispersing disk 37 consists of an annular ring, as best shown in Figure 3, having a straight edge portion 38 and a beveled inwardly and downwardly edge portion 39. The diameter of the straight edge portion 38 is such as to permit the disk 37 to fit snugly within the extension tube 31 with its beveled portion, providing a reduced or constricted opening, resting on the correspondingly beveled shoulder 33 of the union ferrule 32. The dispersing disk 37 had a plurality of spaced arms 41 which, in the modification illustrated, are shown extending radially at angles of ninety degrees in a horizontal plane across the opening therethrough.

A second tubular extension 42, has a union ferrule 32a, which makes it adaptable for mounting axially below the lower end of the first tubular extension 31 in the same manner in which the extension 31 is connected with the discharge end of the lower chamber 11. A second dispersing disk 37a, which is constructed identically with the disk 37, is positioned therebetween with its cross-arms 41a projecting along different vertical planes from the cross-arms 41 of the first disk 37. The second tubular extension 42 is likewise provided at its lower or discharge end with a union ferrule 24b, which provides means for a further extension being added thereto.

A third tubular extension 46, has a union ferrule 32b, which makes it adaptable for mounting axially below the lower end of the second tubular extension 42 in the same manner in which the extension 31 is connected with the discharge outlet of the lower chamber 11. A third dispersing disk 37b positioned therein, with its cross-arms 41b projecting in different vertical planes from the cross-arms 41 and 41a of the first two dispersing disks 37 and 37a, is adapted to be mounted therebetween.

In the operation of the apparatus, it will be assumed that the basic substance, such as soft plastic semi-frozen ice cream, is being forced under pressure into the inlet port 12, filling the lower chamber 11 and passing around the delivery tubes 23 projecting therein, and that a contrasting flavoring material, such as a chocolate syrup or fruit puree, is being similarly forced under a substantially corresponding pressure into the inlet port 16 of the upper chamber 14, filling the same and passing through the apertures 22 in the baffle plate 20 and down into and through the depending delivery tubes 23 projecting downwardly into the lower chamber 11 and into the moving stream of basic substance in the form of a plurality of spaced longitudinal cores.

It has been discovered that, if the lower extrusion chamber 11 is provided with a substantial outlet portion, extending a considerable distance beyond the ends of the delivery tubes 23, the composite mass or stream of moving material, viz: the cylindrical mass of basic substance with its plurality of spaced cores of flavoring material therein, will rotate or spiral counterclockwise as it is being extruded downwardly through the chamber 11. By inserting a stationary pattern-making or dispersing disk having a restricted passageway and a series of radial arms in the path of said spirally composite mass, thereby partially obstructing its flow, the same will be momentarily compacted and the radial arms will cause a turbulence to be set up therein whereby the flavoring cores will become broken up and the portions of flavoring material will be scattered throughout the basic substance as it passes beyond said arms and the compacting pressure is released. If a single patternmaking or dispersing disk is insufficient to provide an attractive pattern for the contrasting flavoring material in the basic substance, a second tubular extension 42 may be mounted below the first stationary pattern-making disk 37, which is of a length sufficient to permit the composite mass after passing through the first dispersing disk 37 to reform and respiral in its movement down the nozzle 10.

As soon as the composite moving stream of material has reformed and is again spiralling down the nozzle, a second stationary pattern-making or dispersing disk may be mounted in the tubular extension of the discharging nozzle, with its radial arms extending in a different position. The second disk serves to further break up the contrasting flavoring material and enhance the pattern. Even then the distribution may not be satisfactory, and, in such event, further breaking up of the moving stream of material may be desired. The nozzle may further be extended a distance sufficient for the moving mass to again reform and move in a spiral formation, whereupon a third stationary pattern-making or dispersing disk may be mounted in the line with its arms extending still in a different position from either of the first two mentioned pattern-making disks. The discharge end of the nozzle, however, must be extended for a substantial distance beyond the last disk in order to permit the flowing stream of material to overcome the turbulence set up by the last disk before it is ready to be discharged from the nozzle into a container or package for distribution to the trade. Obviously, the number of dispersing disks may be extended beyond three if it is found necessary under certain operating conditions.

It is impossible and in fact impractical to set up any satisfactory table for use as a guide in constructing my apparatus because of the large number of variable factors involved in an operation of this kind. It has been found that the size of the tubing forming the nozzle, the amount of pressure, the nature of the ingredients, temperature, amount of over-run in the substances, humidity and atmospheric conditions all serve to vary the situation. However, I have found that by using two continuous ice cream freezers, one for the contrasting flavoring and the other for the ice cream or basic substance, under corresponding pressures, producing at a speed of 180 gallons per hour for the finished product, using 150 gallons of basic substance to 30 gallons of flavoring material, which is a ratio of 5 to 1, an excellent pattern can be obtained with three dispersing disks mounted in spaced relation in a tubular nozzle formed from 1½ inch stainless steel tubing. The arms of the dispersing disks have a total area equal to approximately one-third of the total cross-sectional area of the passageway therethrough, and have been positioned at thirty, sixty and ninety degrees so as to be arranged in different vertical planes. In this operation, it was found that the spacing between dispersing disks should be at least six inches to permit reforming and respiralling of the moving stream. Tests made with larger and smaller tubular sections indicated some variations are required. The larger the cross-section of the tubular nozzle, the longer is the length of tubing required to reform and respiral the moving stream. However, it is believed that any skilled person with the information given will be able to construct the nozzle in a variety of sizes capable of giving a commercially good pattern in the finished product. It is realized that the expression "commercially good pattern" is indefinite, but manufacturers differ in their likes in connection with the pattern. However, it is believed a good pattern is one in which the contrasting flavoring material is more or less uniformly and evenly distributed throughout the basic substance.

Although I have described in detail only one form which the invention may assume, it will be readily apparent to those skilled in the art that the same is not so limited, but that various modifications may be made therein without departing from the spirit thereof.

What I claim is:

1. The method of making variegated ice cream and the like which comprises moving spirally under pressure a relatively large core of a basic substance, discharging under a substantially corresponding pressure a relatively small core of a contrasting flavoring material into said moving spiral stream, compacting said composite spiral stream, breaking up the composite stream, and then releasing said compacting pressure to cause separation and distribution of the flavoring material throughout said basic substance and to permit a respiralling of said moving composite stream.

2. The method of making variegated ice cream and the like which comprises moving spirally under pressure a core of a basic substance having a relatively large cross-sectional area, introducing under pressure into said large core a plurality of spaced cores of a contrasting flavoring material having a relatively small cross-sectional area to form a composite moving spiral stream, compacting said composite moving stream, breaking up the composite stream, and then releasing said compacting pressure to cause separation and distribution of the flavoring material throughout the basic substance and to permit a respiralling of said moving composite stream.

3. The method of making variegated ice cream and the like which comprises moving under pressure a tubular mass of a basic substance having a relatively large cross-sectional area, introducing longitudinally into said mass under pressure a plurality of spaced cores of a contrasting flavoring material each having a relatively small cross-sectional area to form a composite stream, compacting said composite stream, breaking up said composite stream, releasing said compacting pressure to cause a separation and distribution of the flavoring material in said basic substance, reforming said composite stream to permit a respiralling thereof, again compacting said reformed stream, releasing said second compacting pressure to cause further separation and distribution of said flavoring material, and then reforming said composite stream to permit a respiralling thereof.

4. The method of making variegated ice cream and the like which comprises moving spirally under pressure a tubular mass of a basic substance having a relatively large cross-sectional area, introducing into said tubular mass under pressure a plurality of spaced longitudinal tubular cores of a contrasting flavoring material each having a relatively small cross-sectional area to form a composite spiralling stream, compacting said composite spiralling stream, breaking up said composite spiralling stream, releasing said compacting pressure to cause separation and distribution of the flavoring material in said basic substance, reforming said stream to permit a respiralling thereof, and repeating said compacting, releasing and reforming steps until the flavoring material is separated and distributed in said basic substance in the form of an attractive pattern.

References Cited in the file of this patent

UNITED STATES PATENTS

| Number | Name | Date |
|---|---|---|
| 2,190,226 | Alexander | Feb. 13, 1940 |
| 2,246,871 | Balch | June 24, 1941 |
| 2,334,052 | Wedin | Nov. 9, 1943 |
| 2,479,261 | Reetz | Aug. 16, 1949 |
| 2,561,457 | Beales et al. | July 24, 1951 |